(12) United States Patent
Kevern et al.

(10) Patent No.: US 11,524,907 B2
(45) Date of Patent: Dec. 13, 2022

(54) GRANULAR FILTER MEDIA

(71) Applicants: John T. Kevern, Kansas City, MO (US); Megan L. Hart, Kansas City, MO (US)

(72) Inventors: John T. Kevern, Kansas City, MO (US); Megan L. Hart, Kansas City, MO (US)

(73) Assignee: The Curators of the University of Missouri, Columbia, MO (US)

( * ) Notice: Subject to any disclaimer, the term of this patent is extended or adjusted under 35 U.S.C. 154(b) by 298 days.

(21) Appl. No.: 16/757,147

(22) PCT Filed: Oct. 19, 2018

(86) PCT No.: PCT/US2018/056730
§ 371 (c)(1),
(2) Date: Apr. 17, 2020

(87) PCT Pub. No.: WO2019/079731
PCT Pub. Date: Apr. 25, 2019

(65) Prior Publication Data
US 2020/0239332 A1    Jul. 30, 2020

Related U.S. Application Data

(60) Provisional application No. 62/574,423, filed on Oct. 19, 2017.

(51) Int. Cl.
*C02F 1/28*    (2006.01)
*B01D 39/06*    (2006.01)
*B01J 20/02*    (2006.01)
*B01J 20/30*    (2006.01)
*B01J 20/32*    (2006.01)
(Continued)

(52) U.S. Cl.
CPC .............. *C02F 1/288* (2013.01); *B01D 39/06* (2013.01); *B01J 20/02* (2013.01); *B01J 20/3028* (2013.01); *B01J 20/32* (2013.01); *C02F 1/281* (2013.01); *C02F 1/283* (2013.01); *C02F 1/5236* (2013.01); *C02F 2101/105* (2013.01); *C02F 2101/163* (2013.01); *C02F 2101/20* (2013.01); *C02F 2103/001* (2013.01); *C02F 2103/06* (2013.01)

(58) Field of Classification Search
None
See application file for complete search history.

(56) References Cited

U.S. PATENT DOCUMENTS 2,650,171 A    8/1953  Schaaf
10,322,360 B2 *  6/2019  Ganguli ................. C02F 1/288
(Continued)

OTHER PUBLICATIONS

Portland Cement Association, https://www.cement.org/cement-concrete/concrete-materials/aggregates, downloaded Apr. 8, 2022. (Year: 2022).*

(Continued)

*Primary Examiner* — Chester T Barry
(74) *Attorney, Agent, or Firm* — Stinson LLP (57) ABSTRACT

One aspect of the present invention is directed to a granular filter media for removing contaminants from water or other liquids. The media comprise granular materials comprising aggregate and remediation materials. Other aspects of the invention are directed to methods of making and using the granular filter media of the invention.

24 Claims, 3 Drawing Sheets

(51) Int. Cl.
*C02F 1/52* (2006.01)
*C02F 101/10* (2006.01)
*C02F 101/16* (2006.01)
*C02F 101/20* (2006.01)
*C02F 103/00* (2006.01)
*C02F 103/06* (2006.01)

(56) References Cited

U.S. PATENT DOCUMENTS

| | | | | |
|---|---|---|---|---|
| 2003/0132167 | A1* | 7/2003 | Haase | C02F 1/683 210/696 |
| 2007/0181511 | A1* | 8/2007 | Smith | C02F 1/281 210/792 |
| 2011/0253634 | A1* | 10/2011 | Soane | C02F 1/28 210/488 |
| 2011/0303609 | A1* | 12/2011 | Isovitsch Parks | C02F 1/281 210/663 |
| 2012/0145640 | A1* | 6/2012 | Davis | B01J 20/043 423/430 |
| 2013/0142693 | A1* | 6/2013 | Flick | C02F 1/722 422/186 |
| 2014/0241979 | A1 | 8/2014 | Van Mechelen et al. | |
| 2015/0290619 | A1 | 10/2015 | Alvarez et al. | |

OTHER PUBLICATIONS

International Search Report and Written Opinion for related PCT/US2018/056730 dated Feb. 15, 2019 (15 pgs).

Holmes, "Heavy Metal Removal Capacity of Individual Components of Permeable Reactive Concrete", J. Contam. Hydrol., Jan. 2017, pp. 52-61, vol. 196 (10 pgs).

* cited by examiner

GRANULAR FILTER MEDIA

CROSS-REFERENCE TO RELATED APPLICATIONS

This application is based on and claims priority to U.S. Provisional Application Ser. No. 62/574,423 filed on Oct. 19, 2017, which is hereby incorporated herein by reference.

BACKGROUND OF THE INVENTION

1. Field of the Invention

The invention is directed to the field of materials for use in filtration of contaminated water.

2. Description of Related Art

High levels of nutrient (nitrate and phosphate) runoff from agricultural tile lines have come to the forefront as primary pollutants of concern for the United States. Nutrient pollution from point and non-point sources directly contribute the international anoxic zone in the Gulf of Mexico (Dead Zone) and the EPA is now investigating contributions of nutrients from publicly-owned treatment works, fertilizers, agricultural sources, and non-point sources. For example, the City of Des Moines previously filed lawsuit against all upstream farm drainage into the Des Moines River due to the extra cost to remove nitrate from the drinking water. Phosphorus is more of an issue with lakes and coastal applications. Missouri has strong lake communities and has lake limits for publicly owned treatments works (POTWs) but not non-point.

Inorganic and organic nitrates cause eutrophication in fresh water sources and so far, lacks a non-biological means for removal. Current techniques for nitrate removal are biological with incorporation of nitrate into plant structures currently the only viable technique on the market. Phosphate removal is much easier and many different technologies exist for construction runoff. The most common techniques minimize soil runoff from sites. Various systems exist which bind phosphate with aluminum or iron to form insoluble compounds. There is a clear and emerging need for agricultural and non-point nitrate non-biological removal methods and in-place filtration techniques.

Fully and partially fluorinated hydrocarbons have been widely utilized for various applications from Teflon® production to firefighting foams resulting in extensive subsurface contamination. Per- and polyfluoroalkyl substances (PFASs) are bioaccumlative and persistent once entered into the environment. In particular, perfluorooctanoic acid (PFOA)($C_7F_{15}COOH$) has been measured in human blood and organics, detected in surface and subsurface water, and is present in the plants and animals interacting with these waters. PFASs have been shown to be extremely resistant to degradation, both natural and biological. As a result, bioaccumulation occurs within food chains. Primary exposure for people occurs through drinking water sources, fish consumption, nursing mothers, and microwave popcorn. Such exposure can cause chronic health impacts and developmental delays in children. Recent literature suggests that the evidence for global exposure and concentration within human bodies and wildlife is increasing.

Strong C—F bonds (116 kcal/mol) are responsible for the persistence in the environment, causing PFASs to be stable and resistant to biodegradation. Advanced oxidation, which is typically employed to degrade persistent organic chemicals, is reported to be ineffective as the C—F bonds resist complete reduction by hydroxyl radicals alone. Adsorption using activated carbon, photocatalysis under titanium dioxide and UV radiation, photolysis, thermolysis, and other methods have been proposed but are either minimally effective, or are energy intensive requiring high temperatures and pressures that are difficult to implement in the field. If complete mineralization and defluorination is not achieved, toxic by-products formed during the process, which can be released and further contaminate the environment.

BRIEF SUMMARY OF THE INVENTION

In one aspect, the present invention is directed to a granular filter media comprising a granular material for removing contaminants from water or other liquids. In certain embodiments, the granular material comprises aggregate and at least one remediation material in contact with the aggregate. Each remediation material is independently in contact with the aggregate via a contact mechanism that may include (a) the remediation material absorbed into the aggregate, (b) the remediation material coated on the surface of the aggregate, (c) the remediation material dusted on the surface of the aggregate, and any combinations thereof.

In certain embodiments, the granular material comprises at least two remediation materials, with each remediation material in contact with the aggregate via different contact mechanisms, or each remediation material in contact with the aggregate via the same contact mechanism. Alternatively, the granular material may comprise at least three remediation materials, with at least two remediation materials in contact with the aggregate via the same contact mechanism and at least one remediation material in contact with the aggregate via a different contact mechanisms.

In certain embodiments, the aggregate is selected from the group consisting of conventional coarse aggregate, conventional fine aggregate, lightweight coarse aggregate, lightweight fine aggregate, recycled concrete coarse aggregate, coal combustion bottom ash coarse aggregate and coal combustion bottom ash fine aggregate and/or the group consisting of sand (manufactured or natural), gravel, crushed stone, slag, recycled concrete, geosynthetic aggregate, limestone, granite, traprock, basalt, clay, shale, slate, pumice, perlite, and vermiculite. The aggregate size may be 150 μm to 4 inches, 150 μm to ⅜ inch, or ⅛ inch to 4 inches. The absorption of the aggregate may be 0 to 40%, 0 to 9%, 0 to 3%, 2 to 20% or 5 to 40%.

In certain embodiments, when the remediation material is impregnated within the aggregate, the remediation material may be selected from the group consisting of calcium hydroxide, ferric chloride, colloidal activated carbon, colloidal silver, photocatalytic titanium dioxide, sulfur, sodium sulfide, and permanganate.

In certain embodiments, when the remediation material is coated on the aggregate, the remediation material may be selected form the group consisting of Portland cement, hydrated lime, limestone powder, calcium sulfo-aluminate (CSA) cement, fly ash, high sodium fly ash, high carbon fly ash, sodium sulfide, elemental sulfur, blast furnace slag, photocatalytic titanium dioxide, and gypsum. In certain embodiments where the remediation material is coated on the aggregate, delayed ettringite has formed or and metastable ettringite, secondary ettringite, or combinations thereof has formed.

In certain embodiments, when the remediation material is dusted on the aggregate, the remediation material may be selected from the group consisting of limestone powder, sepiolite, attapulgite, activated sepiolite, activated attapulgite, photocatalytic titanium dioxide, heat treated gypsum, elemental sulfur, zero valent iron, activated carbon, and persulfate.

In certain embodiments, granular material comprises free aqueous calcium in combination with $e_{aq}^-$, $HO^-$ and $O^-$ generated by radiation of the granular material. In certain embodiments, the granular material has been ground to a powder.

One aspect of the invention is directed to a method for making granular material for removing contamination from water or other liquids. The method includes providing an aggregate and adding a remediation material to the aggregate. The remediation material may be added by one or more of the following processes: (a) adding a solution of a remediation material to the aggregate and (i) allowing the remediation material to absorb into the aggregate or (ii) applying a vacuum to absorb the remediation material into the aggregate; (b) adding a powder of a remediation material and water to the aggregate and mixing, preferably for at least 10 minutes, to form aggregate coated with the remediation material; or (c) adding a powder of a remediation material to the aggregate and mixing, preferably for one minute or less, to form aggregate dusted with the remediation material.

In certain embodiments, the granular material is modified after the remediation material is added. The granular material comprising coated aggregate may be placed in an oven at 80° C. or greater for at least 24 hours to cause delayed ettringite formation. The granular material comprising coated aggregate may be dried and heated at 50° C. or greater for at least 24 hours. The granular material may be activated with radiation.

Another aspect of the invention is directed to a method for filtering contaminated water or other liquids. In certain embodiments, a material of the invention, such as the granular material and/or powder of the invention, may be placed in the path of the contaminated water flow. The water flow may be directed to such path. The water may be surface water or subsurface water flow. In certain embodiments, a material of the invention may be placed in a location to capture water from agricultural tiles, agricultural fields, livestock facilities, golf courses, construction sites, urban areas, snow melt, rainfall, runoff from nuclear sites, other drainage, and docks.

In certain embodiments, a material of the invention is contained in a filter. In certain such embodiments, the filter may be a containment cap or a filter sock. In certain embodiments, after the granular material is used in a process for filtering contaminated water it is crushed and used a soil amendment. The granular material may have been used to filter agricultural runoff, preferably runoff containing nitrate and phosphate, prior to being crushed.

The powered material of the invention may be used to remove contaminants in water, for example in a water contaminant removal process in a public water works or groundwater treatment facility. In such embodiments, the substance may be added as flash mix, coagulant, flocculant, or combinations thereof, or added to a flash mix basin. Certain embodiments of the invention are directed to methods for reclaiming heavy or rare earth metals from a material of the invention that has been used in a processes of the invention.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

DESCRIPTION OF PREFERRED EMBODIMENT

Figure 1:
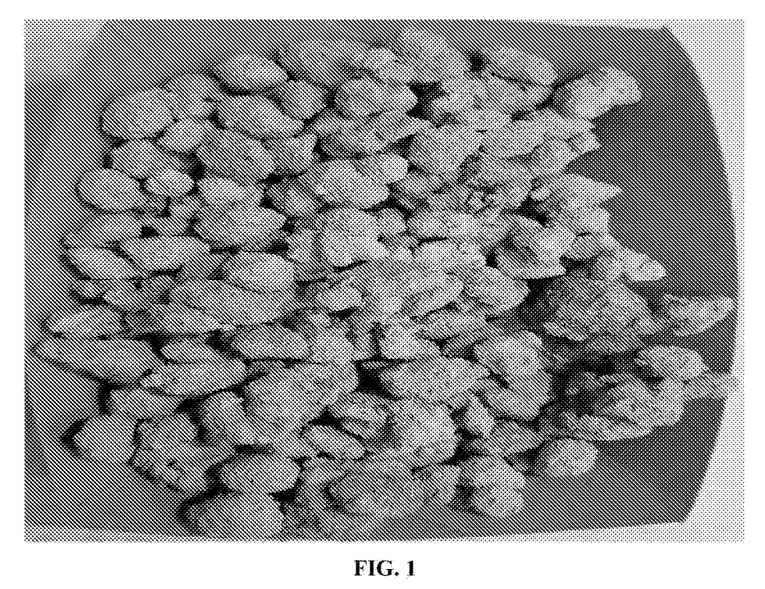
FIG. 1 is a photograph of a mix of granular filter media of the present invention.

The present invention is directed to granular media for use as a filter to remove contaminants from water or other liquids. The granular filter media comprise a granular material comprising an aggregate and at least one remediation material in contact with the aggregate. The aggregates form the core of the granular materials of the present invention to which the remediation materials are applied. The granular filter media may be customized by using remediation material suitable for the intended use. Granular filter media of the present invention are depicted in FIG. 1.

Multiple remediation materials can be used in the media. Each of the remediation materials utilized is independently in contact with the aggregate via at least one of the following contact mechanisms: impregnated (also referred to herein as "absorbed") into the aggregate, coated onto the surface of the aggregate and/or dusted onto the surface of the aggregate. If more than one remediation material is used, each remediation material may be in contact with the aggregate via different contact mechanisms. For example, one remediation material may be impregnated, one may be coated, and one may be dusted, or a combination thereof. In other embodiments, more than one remediation material may be in contact with the aggregate via the same contact mechanism and/or one remediation material may be in contact with the aggregate via more than one contact mechanism. All combinations of impregnated, coated and dusted contact mechanisms with all combinations of remediation materials are contemplated by the invention.

Aggregates

Aggregates suitable for use in the present invention are those generally described as "construction" aggregates. Construction aggregates may include coarse, medium or fine grained particulate materials used in construction. In certain embodiments, the aggregates are siliceous or carbonate-based. Suitable aggregates include, but are not limited to, sand (manufactured or natural), gravel, crushed stone, slag, recycled concrete, geosynthetic aggregate, limestone, granite, traprock, basalt, clay, shale, slate, pumice, perlite, and vermiculite. In certain embodiments, the aggregates can be characterized as conventional coarse aggregate, conventional fine aggregate, lightweight coarse aggregate, lightweight fine aggregate, recycled concrete coarse aggregate, coal combustion bottom ash coarse aggregate and coal combustion bottom ash fine aggregate.

Exemplary aggregates are listed in the following Table 1.

TABLE 1

Aggregates

| Material | Composition | Size | 10 minute water Absorption |
| --- | --- | --- | --- |
| Conventional Coarse aggregate | Any siliceous or carbonate-based aggregate | ASTM C33- ⅛ in to 4 in | 0-9% |
| Conventional Fine aggregate | Any siliceous or carbonate-based aggregate | ASTM C33- 150 μm to ⅜ in | 0-3% |
| Lightweight Coarse Aggregate | Expanded clay, shale, slate, or slag aggregate | ASTM C33- ⅛ in to 4 in | 5-40% |
| Lightweight Fine Aggregate | Expanded clay, shale, slate, or slag aggregate | ASTM C33- 150 μm to ⅜ in | 2-20% |
| Recycled Concrete Coarse Aggregate | Any material which was previously concrete | ASTM C33- ⅛ in to 4 in | 2-20% |
| Coal combustion bottom ash Coarse Aggregate | Any material produced from coal combustion | ASTM C33- ⅛ in to 4 in | 2-20% |
| Coal combustion bottom ash Fine Aggregate | Any material produced from coal combustion | ASTM C33- 150 μm to ⅜ in | 2-20% |

Absorption is a measure of the water holding capacity of the aggregate, which can be measured by tests know in the art, for example by IS:2386 (Part II)-1963. In certain embodiments, absorption of the aggregate used in granular materials of the present invention can range from 0 to 40%, 0 to 20%, 0 to 9%, 0 to 3%, 5 to 40%, 5 to 20%, 5 to 9%, 2 to 20%, 2 to 9% and any value or range between such values.

The granular materials of the present invention may include aggregates of a substantially uniform size or may include aggregates of varying sizes. In certain embodiments, the aggregate sizes can range from 150 μm to 4 inches, 150 μm to ⅜ inch, or ⅛ inch to 4 inches and any value or range between such values.

Remediation Materials

Remediation materials useful in the invention include any remediation materials that are known or found to be suitable for remediating pollutants and that can be impregnated into, coated on or dusted on aggregates. Certain exemplary remediation materials suitable for use in impregnating, coating and dusting aggregates are discussed below. However, in certain embodiments, any of the remediation materials listed below may be used to impregnate, coat or dust the aggregates.

Remediation materials suitable for impregnation into the aggregates include, but are not limited to, calcium hydroxide, ferric chloride, colloidal activated carbon, colloidal silver, photocatalytic titanium dioxide, sulfur, sodium sulfide, and permanganate. Suitable concentrations by volume of the remediation material can range from 0-60%, 0-50%, 0-40%, 0-33%, 0-15%, 0-10%, and any value or range there between. The remediation material concentration may also be 0-1.5 g/l.

Exemplary remediation materials and concentrations are listed in the following Table 2. Concentration percentages listed are based on volume.

TABLE 2

Remediation Materials for Impregnation.

| Remediation Material | Concentration |
| --- | --- |
| Calcium hydroxide | 0-3.2 g/l |
| Ferric chloride | 0-40% |
| Colloidal activated carbon | 0-10% |
| Colloidal silver | 0-60% |
| Photocatalytic Titanium Dioxide | 0-60% |
| Sulfur | 0-50% |
| Sodium sulfide | 0-33% |
| Permanganate | 0-15% |

Remediation materials suitable for coating onto the aggregates include, but are not limited to, Portland cement (optionally partially replaced with gypsum), hydrated lime, limestone powder, calcium sulfo-aluminate cement, fly ash (e.g. ASTM C618 Class C and Class F), high sodium fly ash, high carbon fly ash, sodium sulfide, elemental sulfur, blast furnace slag, photocatalytic titanium dioxide, gypsum (natural or synthetic). Suitable concentrations of remediation materials for coated aggregates, by weight of the granular material, can range from 0-100%, 0-85%, 0-50%, 0-25%, 0-20%, 0-15%, 0-10% and any value or range there between.

Exemplary remediation materials and concentrations are listed in the following Table 3. The mass ranges listed refer to the percent by weight of the granular material.

TABLE 3

Remediation Materials for Coatings

| Remediation Material | Mass Range |
| --- | --- |
| Portland cement | 0-100% |
| Blast Furnace Slag | 0-85% |
| Hydrated lime | 0-25% |
| Limestone powder | 0-50% |
| Calcium sulfo-aluminate cement | 0-100% |
| Fly ash, Class C | 0-85% |
| Fly ash, Class F | 0-50% |
| Photocatalytic Titanium Dioxide | 0-10% |
| Gypsum | 0-15% |

Remediation materials suitable for dusting onto the aggregates include, but are not limited to, limestone powder, sepiolite, attapulgite, activated sepiolite, activated attapulgite, photocatalytic titanium dioxide, heat treated gypsum, elemental sulfur, zero valent iron, activated carbon, and persulfate.

Exemplary remediation materials and concentrations are listed in the following Table 4. The mass ranges listed refer to the percent by weight of the granular material.

TABLE 4

Remediation Materials for Dusting

| Material | Mass Range |
| --- | --- |
| Limestone powder | 0-50% |
| Sepiolite | 0-50% |
| Activated Sepiolite | 0-50% |
| Photocatalytic Titanium Dioxide | 0-50% |
| Heat treated gypsum | 0-50% |
| Elemental sulfur | 0-50% |
| Zero valent iron | 0-50% |

TABLE 4-continued

Remediation Materials for Dusting

| Material | Mass Range |
| --- | --- |
| Activated carbon | 0-50% |
| Persulfate | 0-50% |

Target Pollutants

The granular media include remediation materials to target pollutants. Pollutants that can be remediated with the media of the present invention include, but are not limited to heavy metals, rare earth elements, nutrients, organics, nuclear, as well as other pollutants found in water. Exemplary pollution targets include, but are not limited to, nitrogen/nitrates, ammonia, phosphates, lithophile elements (transition elements such as Al, B, Ba, Be, Br, Ca, Cl, Cr, Cs, F, I, Hf, K, Li, Mg, Na, Nb, O, P, Rb, Sc, Si, Sr, Ta, Th, Ti, U, V, Y, Zr, W and the lanthanides), siderophiles (gold, cobalt, iron, iridium, molybdenum, nickel, osmium, palladium, platinum, rhenium, rhodium, ruthenium, germanium, silver, tungsten, and manganese), chalcophile (Ag, As, Bi, Cd, Cu, Ga, Ge, Hg, In, Pb, S, Sb, Se, Sn, Te, Tl and Zn), arsenates, perchlorate, chromate, cesium, uranium, copper, bromates, fluorinated compounds, (e.g. perfluoroalkoxy alkane (PFA), perfluorocarboxylic acids (PFCA), perfluorononanoic acid (PFNA), perfluorooctanoic acid (PFOA)), aqueous film forming foam (AFFs), long chain organics, solvents, pharmaceuticals, and light and dense non-aqueous phase liquids (LNAPL and DNAPL).

In certain exemplary embodiments, the granular media include remediation materials to target pollutants selected from those listed in the following Table 5.

TABLE 5

Target Pollutants

| Heavy Metals | Nutrients | Organics | Nuclear | Other |
| --- | --- | --- | --- | --- |
| Lead | Nitrate | Per- and polyfluoroalkyl substances (PFAS) | Uranium | Chromium |
| Cadmium | Phosphate | Vinyl Benzene | Cesium | Sulfur/Sulfate |
| Zinc | | PCBs | Thorium | Chloride |
| Arsenic/Arsenite/Arsenate | | | Thallium | Boron |
| Barium | | | | |
| Mercury | | | | Manganese |
| Selenium | | | | Magnesium |
| Silver | | | | Aluminum |
| Cobalt | | | | |
| Copper | | | | |
| Molybdenum | | | | |
| Bismuth | | | | |
| Gallium | | | | |
| Germanium | | | | |
| Indium | | | | |
| Antimony | | | | |
| Tin | | | | |
| Tellurium | | | | |
| Titanium | | | | |

Modified Granular Materials

In certain embodiments, the media of the present invention comprises coated aggregates in which delayed ettringite formation (DEF) has occurred. DEF is not desirable for normal concrete. When concrete is steam cured at high temperatures, typical for precast concrete to quickly remove from the casting beds, it skips one stage of crystal formation. Over time the system will back convert and form ettringite. The ettringite needles cause expansion and cracking. In the present invention, the remediation materials used in coatings to form DEF include any combination of the materials listed a suitable for coatings. Certain embodiments utilize Portland cement as a remediation material, which may include 1-20%, preferably 5-10%, or any value or range there between, replacement with gypsum (synthetic or natural).

As discussed in more detail with respect to step 11 in the example below, to form DEF, the coated aggregates should be cured in a sealed container to prevent drying. This curing may occur at 80° C. or higher, preferably 70° C. to 90° C., for around 24 hours. This ensures that the normal ettringite process is skipped and pushes the crystal towards anhydrite. DEF will happen in a matter of weeks, causing the shell to crack and thereby allowing access by the contaminated fluid to any impregnated material within the aggregate core and increasing the surface area for removal. In general the DEF will assist in remediation of any metal elements that are siderophile (gold, cobalt, iron, iridium, molybdenum, nickel, osmium, palladium, platinum, rhenium, rhodium, ruthenium, germanium, silver, tungsten, and manganese) and/or chalcophile (Ag, As, Bi, Cd, Cu, Ga, Ge, Hg, In, Pb, S, Sb, Se, Sn, Te, Tl and Zn).

In certain embodiments, the media of the present invention comprise coated aggregates in which meta-stable and/or secondary ettringite has formed. Nitrate removal in cementitious filters primarily happens through physical adsorption/absorption and incorporation into the crystalline structure of meta-stable or secondary ettringite. Lower temperature heating converts stable ettringite to meta-stable ettringite. In the present invention, the cementitious remediation materials used in coatings to form meta-stable and/or secondary ettringite include any combination of the materials listed as suitable for coatings. Both conventional Portland cement and calcium-sulfoaluminate systems are improved by heating. Certain embodiments include Portland cement as the coating, in which 1-20%, 5-10% or preferably 7%, or any value or range there between, of the cement is replaced with gypsum (synthetic or natural).

To form meta-stable and/or secondary ettringite, after complete drying the coated aggregates are heated to produce a metastable crystal between anhydrite and gypsum. The granular materials maybe heated at 50-90° C. for around 24 hours.

In certain embodiments, the media are engineered for advanced oxidation and mineralization of organic contaminants, such as PFASs. In order to avoid by-product production, decomposition and defluorination of PFASs to complete mineralization is preferable. The granular materials employed in the present invention provide a mobile, affordable, and complete mineralization process to PFASs that is also highly efficient at permanent decontamination of affected equipment or well purge water produced during subsurface exploration.

The granular materials employed for this embodiment may contain ordinary Portland cement, coarse aggregate, mineral filters, which may include any of the remediation materials discussed herein, water and optionally other supplementary cementitious materials, to form aggregates. The aggregates preferably have greater than 20% void space, between 30 and 50% void space, preferably around 40% void space, or any value or range there between, and hydraulic conductivity greater than 2,000 in./hr, allowing for significant functional reduction.

The cement provides an inorganic binder which allows incorporation of targeted pollutant removing remediation materials without being subject to deterioration from oxidation. The hydrated cementitious structure has an immense surface area and can be engineered with a variety of pore sizes to preferentially remove pollutants. These water-permeable void spaces significantly increase the surface available for chemical reactions and provide the ability for pervious concrete to reduce concentrations of organic pollutants such as full, per-, and poly-fluorinated solutions. Additionally, as solution passes through the void space, reactions with free lime and other cement hydration products to raise the pH over 12 S/U (Holmes et al., 2016; Holmes et al., 2017). Free hydroxyls continue to be produced over thousands of pore volumes of solution, insuring that pH remains elevated throughout treatment. The remediation materials of the present invention may be impregnated/absorbed into the pores by the processes described herein. By itself, removal capacities for the media of this embodiment can achieve a 50% reduction in per- and polyfluoroalkyl substances (PFAS).

Figure 2:
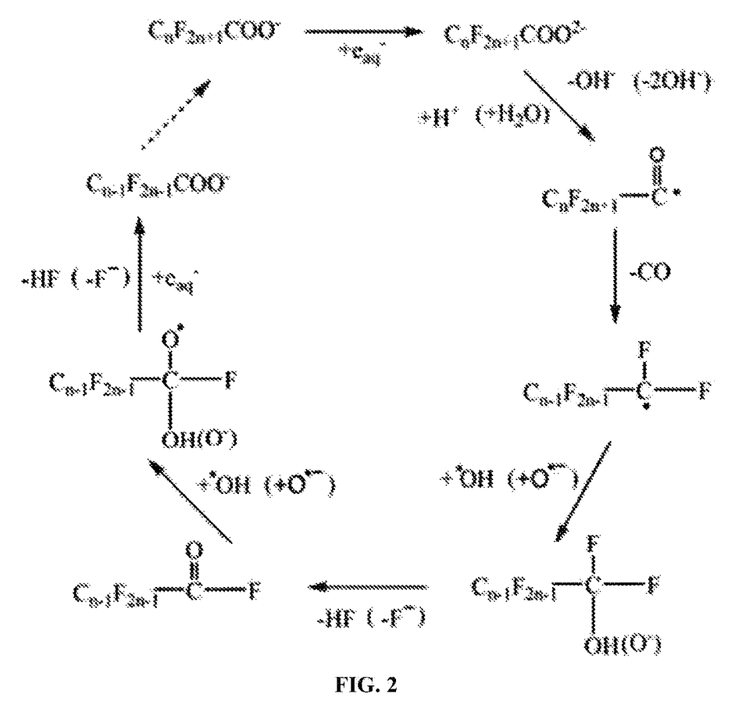
FIG. 2 depicts an expected degradation mechanism for perfluorooctanoic acid (PFOA), one of many PFASs, using the granular media of the present invention as adapted from Zhang et al., 2016.

Activating the granular material using a radiation source imparts an energy to the system which releases free aqueous electrons into solution. The activated granular material comprises free aqueous calcium in combination with $OH^-$, $e_{aq}^-$, and/or $O^-$. A hypothetical degradation pathway using this method is presented in FIG. 2. Radiation has been shown to degrade other persistent organic pollutants at effective and efficient rates but has not been shown to be effective in treating PFASs as the sole remedial technology. However, once activated, cement production of active species $OH^-$ and $e_{aq}^-$, cause unfurling of organic polymers in wastewater and sludge treatments with no addition of chemicals, thus the application of radiation to PFASs as presented in FIG. 2. Irradiated aqueous solutions in which OH- and $e_{aq}$-predominate are further activated as the water absorbs the radiation (see Eq. 1). Bracketed numbers represent the yields of specific species per unit of radiation at pH of 11.0 S/U.

$$H_2O \rightarrow [e_{aq}]^- (0.27) + \cdot OH(0.28) + H_2O_2(0.07) + H\cdot(0.06) + H_2(0.05) \quad \text{Eq. 1}$$

Degradation of PFASs will increase with increasing production of $e_{aq}^-$, $OH^-$ and pH. Optimized decomposition occurs at pH of 13.0 S/U. Using the yields, approximately 1 hour and 6 minutes of contact time is required for ~99% degradation and subsequent defluorination. Further degradation of PFASs occurs because the cementitious media is an alkaline medium producing copious amounts of free hydroxyls and calcium where fluorine ions can combine in a 4:1 ratio as fluorite.

Using published kinetic rates for PFAS degradation, k=0.654 h-1, and a pseudo first order model:

$$dC/dt = -kC \quad \text{Eq. 2}$$

$$\ln(C/C_o) = -kt \quad \text{Eq. 3}$$

the rate of degradation is approximately 20 times higher than reported for the state of the art techniques with a half-life of 1.06 hrs. The negative Gibbs free energy change  of the initial three polymer unfurling steps indicates that the defluorination is thermodynamically favored. The bond lengths of $C_7-F_{14}$ and $C_7-F_{15}$ decrease with the bond angle of $F_{14}-C_7-F_{15}$ increasing. Following this, the C6 radicals in aqueous solution will react with hydroxyl radicals ($OH^-$) to form unstable alcohol, which undergoes HF elimination. After that, $OH^-$ will attack and cleave the C=O bond to form another radical, which can be easily attacked by $e_{aq}^-$. By repeating this $CF_2$-unzipping cycle, PFASs can be completely decomposed to $CO_2$ and $F^-$. In the alkaline aqueous pore solutions present in cementitious filters, OH may be converted to O.- for the pKa value of $OH^-$ is 11.9, and H+ was scavenged by OW. Free fluorine bonds readily with the aqueous calcium in solution produced during contact of water with cement paste. The bonds form an inert fluorite mineral composed of either 2 or 4 fluorine ions bonded strongly to 1 or 2 calcium. These calculations indicate that complete destruction of PFASs is spontaneous in the activated cementitious filter pore solution combined with the synergistic effects of $e_{aq}^-$ and $O^-$ generated by irradiation. Mineralization of the freed fluorine insures that additional waste is not produced.

This same process would function similarly for various other long- and short-chain persistent organic pollutants. Irradiation may be performed with any of the impregnated, coated and dusted aggregates of the invention. In certain embodiments, one or more of alpha radiation, beta radiation, gamma radiation or x radiation may be used.

Methods of Making Granular Media

The present invention is further directed to methods of making the granular media of the present invention. In certain embodiments, the granular media are made according to the following procedures.

The process for adding the remediation material to an aggregate will depend on whether the remediation material will be impregnated, coated or dusted.

The impregnated remediation materials are preferably in solution and absorbed in the aggregate core. The impregnated remediation materials may be added to heated aggregate, mixed and allowed to rest. The impregnated remediation materials may alternatively, or additionally, be vacuum-impregnated into the aggregate. The remediation material may penetrate only the pores at or near the surface of the aggregate. In certain embodiments, particularly where the aggregate has a high pore volume, the remediation material may penetrate interior pores of the aggregate.

The remediation materials used for coating may be in the form of a powder that is mixed with aggregate, in the presence of added water, to form the coating on the surface of the aggregate core. To coat the aggregate core, the remediation materials are preferably mixed with the aggregate for 5 or more minutes, preferably 10 or more minutes, to form aggregate coated with the remediation material.

The remediation materials used for dusting may be in the form of a powder that is mixed with aggregate, after the absorption of any added water, to form a dusting on the surface of the aggregate core. To dust the aggregate core, the remediation materials may be mixed with the aggregate for less than 3 minutes, preferably 1 minute or less, to form aggregate dusted with the remediation material.

To form DEF, the coated aggregate may be placed in an oven at 80° C. or greater, preferably 80° C. to 90° C., for around 24 hours to cause delayed ettringite formation. The heating to form DEF is preferably conducted prior to drying.

To form meta-stable or secondary ettringite, the coated aggregate may be placed in an oven at 50° C. or greater, preferably 50° C. to 90° C., or 50° C. to 70° C., for about 24 hours. The heating to form meta-stable or secondary ettringite is preferably conducted after drying the coated aggregate.

In certain embodiments, the granular materials are activated with radiation, as discussed in more detail above.

The granular filter media may be customized by using remediation material suitable for the intended use.

Figure 3:
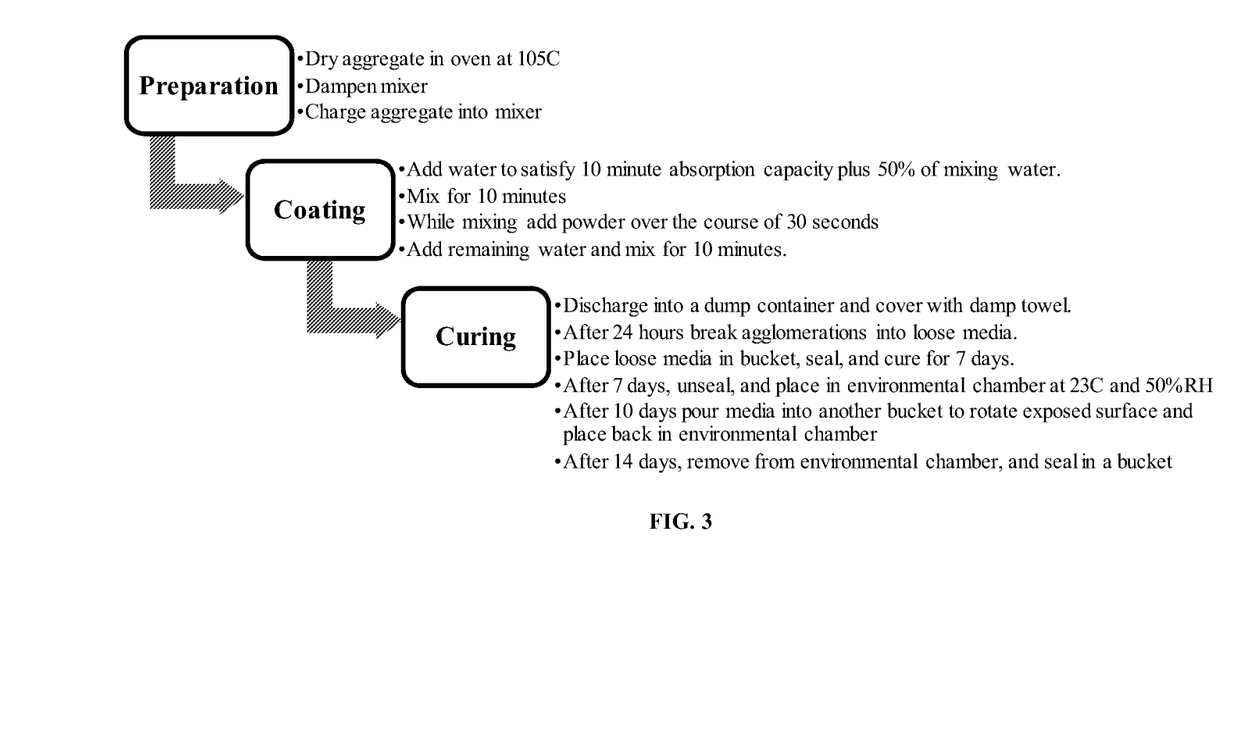
FIG. 3 depicts a process of making the granular filter media with a coating.
Figure 4:
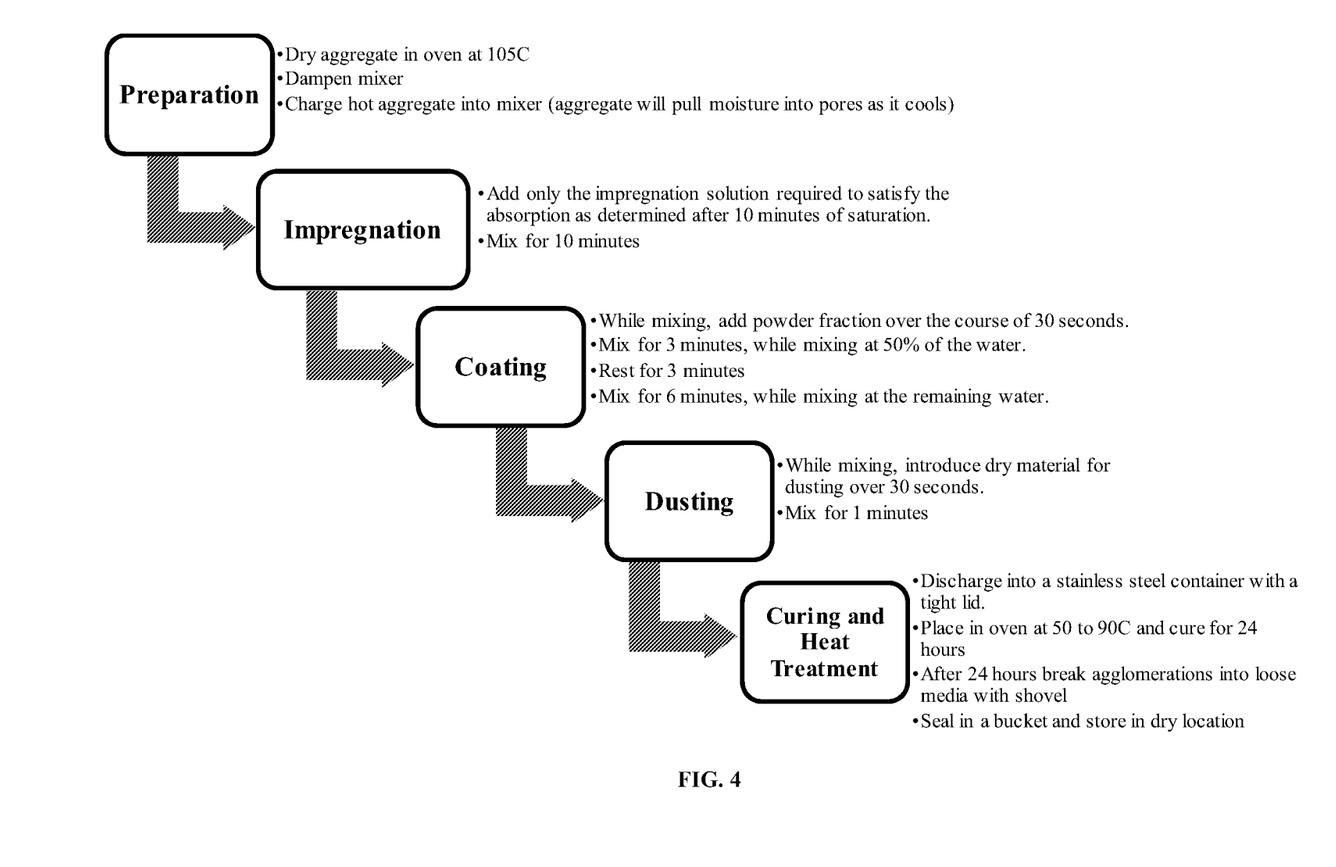
FIG. 4 depicts a process of making the granular filter media with impregnated aggregate, coating and dusting, with a heat treatment for delayed ettringite formation.

Exemplary processes for making the granular filter media are depicted in FIGS. 3 and 4.

Methods of Using Granular Media

The present invention is also directed to a method for using the granular media of the invention to remove contaminants from water or other liquids. In certain embodiments, the granular media of the invention is used to filter contaminated water by placing the granular media in the path of the contaminated water flow. The water flow may be directed to the location of the granular media. The water may be from a point or non-point source. In certain embodiments of the invention, the granular media are placed in the path of surface water runoff or subsurface groundwater flow. In some such embodiments, any of the granular media discussed above are placed to capture water from agricultural tiles, agricultural fields, livestock facilities, golf courses, construction sites, urban areas, snow melt, rainfall, stormwater, runoff from nuclear sites, wastewater, other drainage, and docks.

In certain embodiments, the granular media are formed into a filter. The granular media may be placed in a permeable container in any shape suitable for the intended application. The granular media may be placed in a permeable bag, which may be biodegradable. For example, any of the media discussed above may be placed in a filter sock, which is placed in the path of the contaminated water flow. Stormwater filter socks can be used to intercept and remove nitrate and sediment during construction under certain management practices. In other such embodiments, the granular media can be used to form a containment cap, which may be useful in the embodiments described in the previous paragraph. The granular material may also be deployed at the desired filtration site without being contained in a container.

Nitrate can be removed from aqueous solutions comparable to both urban stormwater and agricultural runoff using the granular media of the present invention. Modular filter systems comprising the granular media can be engineered to last at least one season for agricultural purposes to address specific applications. For example, nitrate as nitrogen in tile drains from corn crop rotations averages 20.5 pounds per mile, given a constant flushing precipitation, a small (24 in.×24 in.×6 in.) filter can remove 100% of the nitrate as nitrogen for a two mile stretch of tile drain for a season.

Orthophosphate as phosphorus is problematic in the coastal areas where salinity is pervasive. Phosphorus eutrophication can be removed for using the granular media of the preset invention. The granular media can be installed as a waddle or filter for both stormwater and agricultural runoff from installations such as golf courses.

The present invention is further directed to a method for forming a soil amendment comprising crushing any media discussed above into a powdered or crushed filter media after use in a method discussed above. For example, depleted filter material can be crushed and reincorporated as fertilizer back into crop production. In some such embodiments the granular media is used to filter agricultural runoff, such as runoff containing nitrate and phosphate, prior to being crushed. The primary chemical compounds from such uses would be calcium nitrate and calcium phosphate, which are commonly added as soil amendments.

The present invention is also directed to a method for reclaiming heavy or rare earth metals by reclaiming the metals from any of the granular media discussed above after use in a method discussed above. Traditional metals reclamation techniques can be used, preferably after crushing. Reclamation from the filter substrate is relatively straightforward, as cement chemistry is similar to limestone.

The present invention is further directed to a substance for removing contaminants from water comprising any of the granular media discussed above that have been ground to a powder. In certain embodiments, the powder is used to remove contaminants from water. In some such embodiments, the powder is used in a water contaminant removal process in a public water works or groundwater treatment facility. In some such embodiments, the powder is added as flash mix, flocculants, coagulants, or combinations thereof, or added to a flash mix basin. For example, powdered versions can be added as a flash mix in a reactor basin prior to chlorination and dechlorination in a wastewater treatment plant where discharge limits require phosphorus removal. In other embodiments, powdered versions can be used prior to lime soda softening or aluminum applications for flash mix in a public water works or other groundwater treatment drinking water source that requires nitrate reductions, or in a flash mix basin prior to disinfection in a wastewater treatment facility.

Filters comprising the granular media can be used to recover nuclear material contaminated in ground or surface water. After filter capacity has been exhausted, the material can be reclaimed.

Filters comprising the granular material of the present invention can be used in a permeable filtration system for stormwater, but can also serve as a permeable reactive barrier or cap by allowing solutions to pass through pore spaces between and within the granular media, while preferentially removing contaminants of concern through physical, chemical, and potentially biological means. The primary removal methods include: (1) sorption, precipitation, complexation, and immobilization on readily available external reaction sites, (2) continuing chemical reaction such as pH increases lead to increase intermediary reactions with hydroxides and carbonates, and internal reaction, (3) internal diffusion of contaminants into porous CSH gel calcium cations are displaced, and (4) over time potential reactions involving biological mechanisms as the granular media serve as a medium for hosting microbial activity.

Removal of lithophile elements (transition elements such as Al, B, Ba, Be, Br, Ca, Cl, Cr, Cs, F, I, Hf, K, Li, Mg, Na, Nb, O, P, Rb, Sc, Si, Sr, Ta, Th, Ti, U, V, Y, Zr, W and the lanthanides) can be enhanced using some of the surface coatings described herein, as will be understood by those skilled in the art.

Example 1

An exemplary method for making the granular materials of the present invention is set forth in this example. Variations in the process for making impregnated, coated and dusted aggregates are noted, as well as DEF balls, are included.

1. Dry aggregate in oven at 105° C.
2. Dampen the mixer.
3. Charge aggregate into the mixer
   a. If not impregnating allow the aggregate to cool before mixing.
   b. If impregnating, add warm/hot aggregate to the mixer (As the aggregate cools it will pull the moisture into the pores.)
4. Add initial water
   a. If coating, or coating and dusting, but not impregnating add water to achieve satisfy the 10 minute absorption plus 50% of mixing water.
   b. If impregnating add only the water/solution to satisfy the 10 minute absorption.
   c. If vacuumed saturated at SSD plus 50% do not add any more water at this stage.

5. Mix for 10 minutes.
6. After 10 minutes, while mixing add powder fraction over the course of 30 seconds.
7. Mix for 3 minutes, flattening the drum angle to incorporate any dry powder caught in the nose.
8. Rest for 3 minutes.
9. If coating, or coating and dusting, resume mixing and add the remaining water over the course of 30 seconds.
   a. If not dusting, mix for 7 more minutes.
   b. If receiving a dusting, mix for 6 minutes, introduce the dry material over the course of 30 seconds. Mix for 1 more minute.
10. Discharge into a large dump pan, spread evenly without compaction, cover with weighted plastic.
11. If creating DEF balls, discharge into stainless steel container with tight lid. Place in oven at 80° C. for 24 hours. Otherwise allow to cure at ambient conditions.
12. After 24 hours gently break up the agglomerations with a shovel, scoop, or by hand.
13. Place the granular material in a clean bucket, seal, label, and place in the curing room.
14. After 7 days remove the lid and place the bucket in the environmental chamber (50% RH, 73° F.).
15. After 10 days pour the granulated material into another bucket to rotate the exposed surfaces and place back into the environmental chamber (50% RH, 73° F.).
16. After 14 days put the dry granulated material into stainless steel half steam table trays, label, and place in the chest freezer.
   a. If creating nitrate balls, place in over at 50° C. for 24 hours before placing in freezer.

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

We claim:

1. A granular material for removing contaminants from water comprising:
   aggregate and at least two remediation materials in contact with said aggregate;
   wherein each of said remediation materials is either in contact with the aggregate via different contact mechanisms or is in contact with the aggregate via the same contact mechanism and the contact mechanism is selected from the group consisting of the remediation material absorbed into the aggregate, the remediation material coated on the surface of the aggregate, the remediation material dusted on the surface of the aggregate, and combinations thereof.

2. The granular material of claim 1, wherein each remediation material is in contact with the aggregate via different contact mechanisms.

3. The granular material of claim 1, wherein each remediation material is in contact with the aggregate via the same contact mechanism.

4. The granular material of claim 1, comprising at least three of said remediation materials, wherein at least two remediation materials are in contact with the aggregate via the same contact mechanism and at least one remediation material is in contact with the aggregate via a different of said contact mechanisms.

5. The granular material of claim 1, wherein the aggregate size is 150 μm to 4 inches, 150 μm to 3/8 inch, or 1/8 inch to 4 inches.

6. The granular material of claim 1, wherein the absorption of the aggregate is 0 to 40%, 0 to 9%, 0 to 3%, 2 to 20% or 5 to 40%.

7. The granular material of claim 1, wherein the remediation material is selected from the group consisting of calcium hydroxide, ferric chloride, colloidal activated carbon, colloidal silver, photocatalytic titanium dioxide, sulfur, sodium sulfide, and permanganate when the remediation material is impregnated within the aggregate.

8. The granular material of claim 1, wherein the remediation material is selected form the group consisting of Portland cement, hydrated lime, limestone powder, calcium sulfo-aluminate cement, fly ash, high sodium fly ash, high carbon fly ash, sodium sulfide, elemental sulfur, blast furnace slag, photocatalytic titanium dioxide, and gypsum, when the remediation material is coated on the aggregate.

9. The granular material of claim 1, wherein the remediation material is selected from the group consisting of limestone powder, sepiolite, attapulgite, activated sepiolite, activated attapulgite, photocatalytic titanium dioxide, heat treated gypsum, elemental sulfur, zero valent iron, activated carbon, and persulfate when the remediation material is dusted on the aggregate.

10. The granular material of claim 1, wherein the remediation material is coated on the aggregate and delayed ettringite has formed.

11. The granular material of claim 1, wherein the remediation material is coated on the aggregate and meta-stable ettringite, secondary ettringite, or combinations thereof has formed.

12. The granular material of claim 1, wherein the granular material comprises free aqueous calcium in combination with $e_{aq}^-$, $HO^-$ and $O^-$ generated by radiation of the granular material.

13. A method for making granular material for removing contamination from water comprising:
   providing an aggregate; and
   adding at least two remediation materials to the aggregate by one or more of the following processes:
   (a) adding a solution of said remediation material to the aggregate and (i) allowing said remediation material to absorb into the aggregate or (ii) applying a vacuum to absorb the remediation material into the aggregate;
   (b) adding a powder of said remediation material and water to the aggregate and mixing to form aggregate coated with said remediation material; or
   (c) adding a powder of said remediation material to the aggregate and mixing to form aggregate dusted with said remediation material.

14. The method of claim 13, wherein the coated aggregate is formed, further comprising placing the coated aggregate in an oven at 80° C. or greater for 24 hours to cause delayed ettringite formation.

15. The method of claim 13, further comprising the steps of drying the resulting aggregate/remediation material and heating the dried media at 50° C. or greater for 24 hours.

16. The method claim 13, further comprising activating the resulting aggregate/remediation material with alpha radiation, beta radiation, gamma radiation, or x radiation.

17. A method for filtering contaminated water comprising placing the granulated material, a substance, or the combination in the path of surface water or subsurface water flow.

18. The method of claim 17, wherein the granulated material, the substance or the combination is placed in a location to capture water from agricultural tiles, agricultural fields, livestock facilities, golf courses, construction sites, urban areas, snow melt, rainfall, runoff from nuclear sites, other drainage, and docks.

19. The method of claim 17, wherein the granulated material, the substance, or the combination is contained in a filter.

20. A soil amendment comprising the granular material of claim 1 that has been subjected to a contaminated water flow and crushed.

21. The soil amendment of claim 20, wherein the granular material has been used to filter agricultural runoff, preferably runoff containing nitrate and phosphate, prior to being crushed.

22. A method of removing contaminants in water comprising using the substance of claim 1 in a water contaminant removal process in a public water works or groundwater treatment facility.

23. The method of claim 22, wherein the substance is added as flash mix, coagulant, flocculant, or combinations thereof, or added to a flash mix basin.

24. A method for reclaiming heavy or rare earth metals comprising reclaiming the metals from the granular media of claim 1 that has been subjected to a contaminated water flow.

* * * * *